Aug. 31, 1926.
C. A. ELTAG
LEVELING DEVICE
Filed May 12, 1922
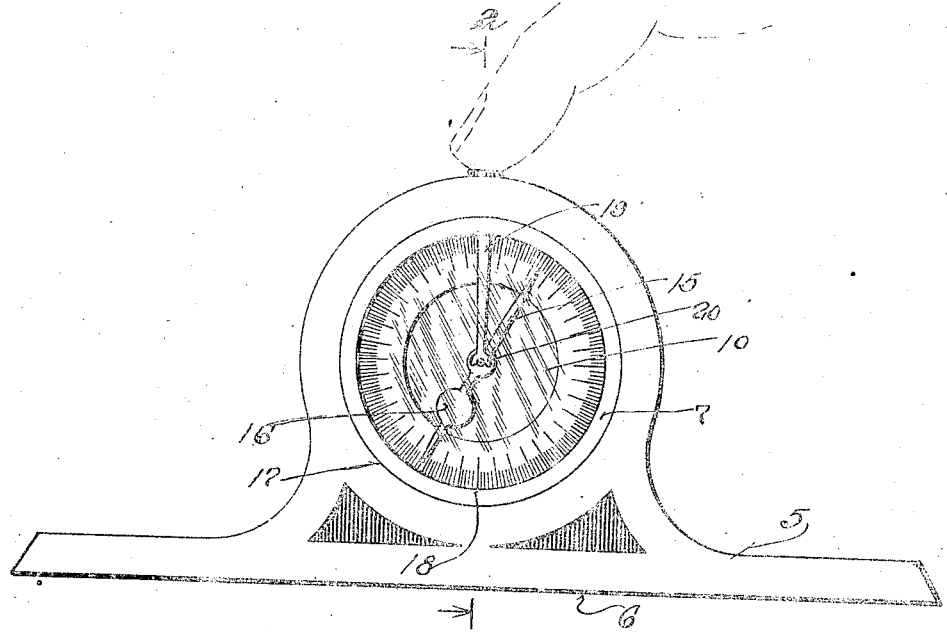
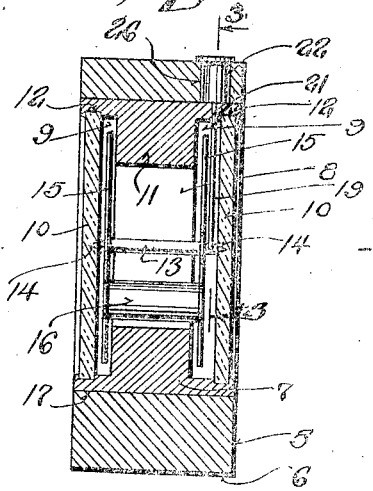
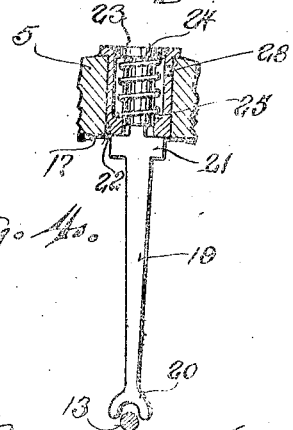
Inventor
Charles A. Eltag
By Ira M. Jones.
Attorney Patented Aug. 31, 1926.

1,597,960

UNITED STATES PATENT OFFICE.

CHARLES A. ELTAG, OF MILWAUKEE, WISCONSIN.

LEVELING DEVICE.

Application filed May 12, 1922. Serial No. 560,426.

This invention relates to certain new and useful improvements in devices for obtaining the degree of inclination of various objects or for use in leveling such objects.

In the type of leveling device illustrated in Letters Patent No. 1,403,677 granted to myself and John M. Thoennes, January 17, 1922, one objection is found in that the indicator is highly sensitive and much time is lost before it comes to an absolute rest to permit reading thereof, and furthermore it is impossible to maintain the indicator in any set position to permit the removal of the leveling device without destroying the setting of the indicator.

It is therefore an object of this invention to provide means for checking the movement of the indicator whereby the reading thereof is materially facilitated and furthermore the indicator may be held at any desired position.

A further object of this invention is to provide a device of the nature described in which improved brake or check means are employed for restraining movement of the indicator, such check means being normally inactive to permit free movement of the indicator or capable of instant operation to check the oscillation of the indicator.

A still further object of this invention resides in the provision of an accurately balanced indicator whereby an extremely sensitive instrument is obtained.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of my invention constructed according to the best mode I have so far devised for the practical application of the principles thereof, and in which:

Figure 1 is a front view of one type of instrument illustrating my improved device as applied thereto;

Figure 2 is a view taken transversely through the instrument on the line 2—2 of Figure 1, the indicator and the brake means being in elevation;

Figure 3 is an enlarged view partly in section and partly in elevation taken on the plane of line 3—3 of Figure 2, and Figure 4 is a detail view looking at the under side of the push button of the brake member.

The principles of this invention may be used in a great variety of forms and for many purposes, and referring now more particularly to the drawing it will be seen that the invention has been illustrated in connection with a level 5 including a straight edge or work engaging face 6 adapted for engagement with the surface, the angle of inclination of which is to be ascertained.

Set in the supporting means or member 5 is the indicating device which consists of a cylinder 7 having a central bore 8 each end of which is counterbored, as at 9. The ends of the cylinder are closed by relatively heavy transparent glass discs 10 secured in channels 12 and slightly spaced from a central web 11 formed by the counter bores 9.

Centrally journaled in bore 8 is a pivot shaft 13, the ends 14 of which are journaled in apertures of the inner faces of the discs 10. Fixed to pivot shaft 13 within the counterbores 9 are two indicating members 15 connected together in true alignment by a counter-balance 16. The counter-balance 16 is so positioned and located as to make the indicators responsive to the slightest movement of cylinder 7 and each side face of rib 11 is graduated in order that the inclination of the indicator may be readily ascertained.

When my improved device is employed with that type of tool illustrated in Figure 1, cylinder 7 is secured in an aperture 17 formed therein with the zero designation 18 on the rib 11 in true vertical alignment with respect to the work engaging face 6.

By reason of the extreme sensitiveness of the indicators, much time is lost in waiting for the indicators to come to rest after the tool has been placed on the surface to be measured and, in order to facilitate reading of the angle of inclination of the work face, I employ brake means for checking the oscillation of the indicators. In this form of my invention the brake means consists of an arm or lever 19, the inner end of which is forked, as at 20, and arranged so that upon depression it will engage pivot shaft 13 and check its tendency to rotate.

The upper end of lever 19 is substantially cross-shaped, the horizontal arms 21 of which normally abut the inner end of a removable sleeve 22 to limit upward movement thereof under action of a spring 23 confined within the sleeve between the head 24 of a cap secured to the outer end of lever 19 and a shoulder 25 formed at the inner end of the sleeve.

In equipping my device with the improved brake, tool 5 is bored, as at 26, and sleeve 22 secured therein and when it is desired to remove the brake, cap 24 is depressed to permit the insertion of a tool (not shown) through slot 27 in the side of head 24 to engage in opening 28 in the side wall of the sleeve to facilitate its removal or adjustment to properly align the forked end 20 with the pivot shaft.

From the foregoing description taken in connection with the accompanying drawing it will be readily apparent that the brake means I have illustrated is normally inoperative and can be instantly brought into play to check rotation of the indicator or can be used to secure the indicator in any position.

What I claim as my invention is:

1. A device for measuring the angle of inclination of a surface, comprising a supporting means adapted to rest on the surface, an indicator carried by the supporting means and normally seeking a vertical position, a sleeve member secured in the support, a projection extended inwardly at the inner end of the sleeve member, an indicator braking member having its inner end engageable with the indicator to brake the same and its outer end passed into the sleeve member, a spring confined between the outer end of the braking member and the projection at the inner end of the sleeve member, and a stop on the braking member adapted to limit the movement of the braking member under the action of the spring.

2. A device for measuring the angle of inclination of a surface, comprising a supporting means adapted to rest on the surface, an indicator carried by the supporting means and normally seeking a vertical position, a sleeve member secured in an opening in the support, a projection extended inwardly at the inner end of the sleeve member, an indicator braking member having its inner end engageable with the indicator to brake the same and its outer end passed into the sleeve member, a head on the end of the braking member in the sleeve member, a spring confined between the head on the outer end of the braking member and the projection at the inner end of the sleeve member, a projection on the braking member adapted to abut the sleeve member inner end to limit the movement of the braking member under the force of the spring, and tool receiving means in the sleeve member for facilitating the adjustment of the sleeve member in, and its withdrawal from, the support.

In testimony whereof I affix my signature.

CHARLES A. ELTAG.